(12) United States Patent
Wengert et al.

(10) Patent No.: US 12,735,104 B2
(45) Date of Patent: Sep. 15, 2026

(54) MEASURING SYSTEMS AND METHODS FOR STEERING ANGLES OF VEHICLES

(71) Applicant: Torc Robotics, Inc., Blacksburg, VA (US)

(72) Inventors: Nicolai Wengert, Burgstetten (DE); Florian Kuehnle, Stuttgart (DE); Malte Ricklefs, Kernen (DE)

(73) Assignee: TORC ROBOTICS, INC., Blacksburg, VA (US)

( * ) Notice: Subject to any disclaimer, the term of this patent is extended or adjusted under 35 U.S.C. 154(b) by 23 days.

(21) Appl. No.: 19/071,040

(22) Filed: Mar. 5, 2025

(65) Prior Publication Data

US 2026/0264755 A1 Sep. 10, 2026

(51) Int. Cl.
*B62D 15/02* (2006.01)
*G06T 7/73* (2017.01)

(52) U.S. Cl.
CPC .............. *B62D 15/024* (2013.01); *G06T 7/74* (2017.01); *G06T 2207/30268* (2013.01)

(58) Field of Classification Search
CPC .................... B62D 15/024; G06T 7/74; G06T 2207/30268
See application file for complete search history.

(56) References Cited

U.S. PATENT DOCUMENTS

| | | | |
|---|---|---|---|
| 4,808,812 A | 2/1989 | Tanaka et al. | |
| 5,642,106 A | 6/1997 | Hancock et al. | |
| 6,304,190 B1 | 10/2001 | Blasing | |
| 9,522,699 B2 | 12/2016 | Raad et al. | |
| 9,848,112 B2 | 12/2017 | Piekniewski et al. | |
| 10,198,010 B2 | 2/2019 | Hiramatsu et al. | |
| 11,544,858 B2 | 1/2023 | Suissa et al. | |
| 2006/0209188 A1* | 9/2006 | Mizusawa .......... | B62D 15/0295 348/148 |
| 2012/0283912 A1 | 11/2012 | Lee et al. | |
| 2023/0134125 A1 | 5/2023 | Baltaxe et al. | |

* cited by examiner

*Primary Examiner* — Long T Tran
*Assistant Examiner* — Charles J Brauch
(74) *Attorney, Agent, or Firm* — Armstrong Teasdale LLP

(57) ABSTRACT

A steering angle detection assembly for measuring a steering angle of an autonomous vehicle is provided. The steering angle detection assembly includes at least one camera, at least one marker, and one or more processors in communication with at least one memory device. The steering angle detection assembly is operable to cause the at least one camera to capture one or more images of the marker. The steering angle detection assembly is operable to determine a position of the at least one marker in the one or more images and determine a steering angle of the autonomous vehicle.

20 Claims, 11 Drawing Sheets

MEASURING SYSTEMS AND METHODS FOR STEERING ANGLES OF VEHICLES

TECHNICAL FIELD

The field of the disclosure relates generally to measuring systems and, more specifically, to systems and methods for measuring a steering angle of a vehicle.

BACKGROUND OF THE INVENTION

Autonomous vehicles operate with limited human input such that tracking the mechanical movements of the autonomous vehicle is needed for controlling operation of the autonomous vehicle. For example, a steering angle of a front wheel of an autonomous vehicle will determine the trajectory of the autonomous vehicle on the road. By tracking the steering angle, the autonomous vehicle may adapt to various road conditions and execute autonomous decisions such as lane changes or obstacle avoidance. Accordingly, improved systems and methods for measuring a steering angle of a vehicle is desirable.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a steering angle detection assembly for measuring a steering angle of a vehicle is provided. The steering angle detection assembly includes at least one camera, the at least one camera configured to be mounted on an autonomous vehicle, an angle marker, the at least one angle marker positioned on a tie rod of an autonomous vehicle. The steering angle detection assembly is in communication with the at least one camera, the steering angle detection assembly including at least one processor in communication with at least one memory device. The at least one processor is programmed to receive one or more images of an angle marker. The at least one processor is further programmed to compare a first image and a reference image of the one or more images, determine a position of an angle marker from the comparison of the first image and reference image, and determine a steering angle based at least in part on the position of the marker.

In another aspect of the disclosure, a method for measuring a steering angle of a vehicle is provided. The method includes receiving one or more images of an angle marker positioned on a tie rod of a vehicle, the one or more images captured by a camera, the camera configured to be mounted on a vehicle at a location stationary relative to an axel of the vehicle. The method further includes comparing a first image of the one or more images with a reference image of the one or more images of the angle marker. The method also includes determining a position of the angle marker at least in part on the comparison of the first image and reference image. The method further includes determining a steering angle based at least in part on the change in the position of the angle marker.

In yet another aspect, one or more non-transitory computer readable media for measuring a steering angle of a vehicle is provided. The one mor more non-transitory computer readable media includes a plurality of instructions stored that, in response to being executed, cause a system to receive one or more images of an angle marker. The one or more non-transitory computer readable media further cause the system to compare a first image of the one or more images with a reference image of the one or more images of the angle marker, determine a change of position of the angle marker from the comparison of the first and reference marker image, and determine a steering angle based at least in part on the position of the angle marker.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
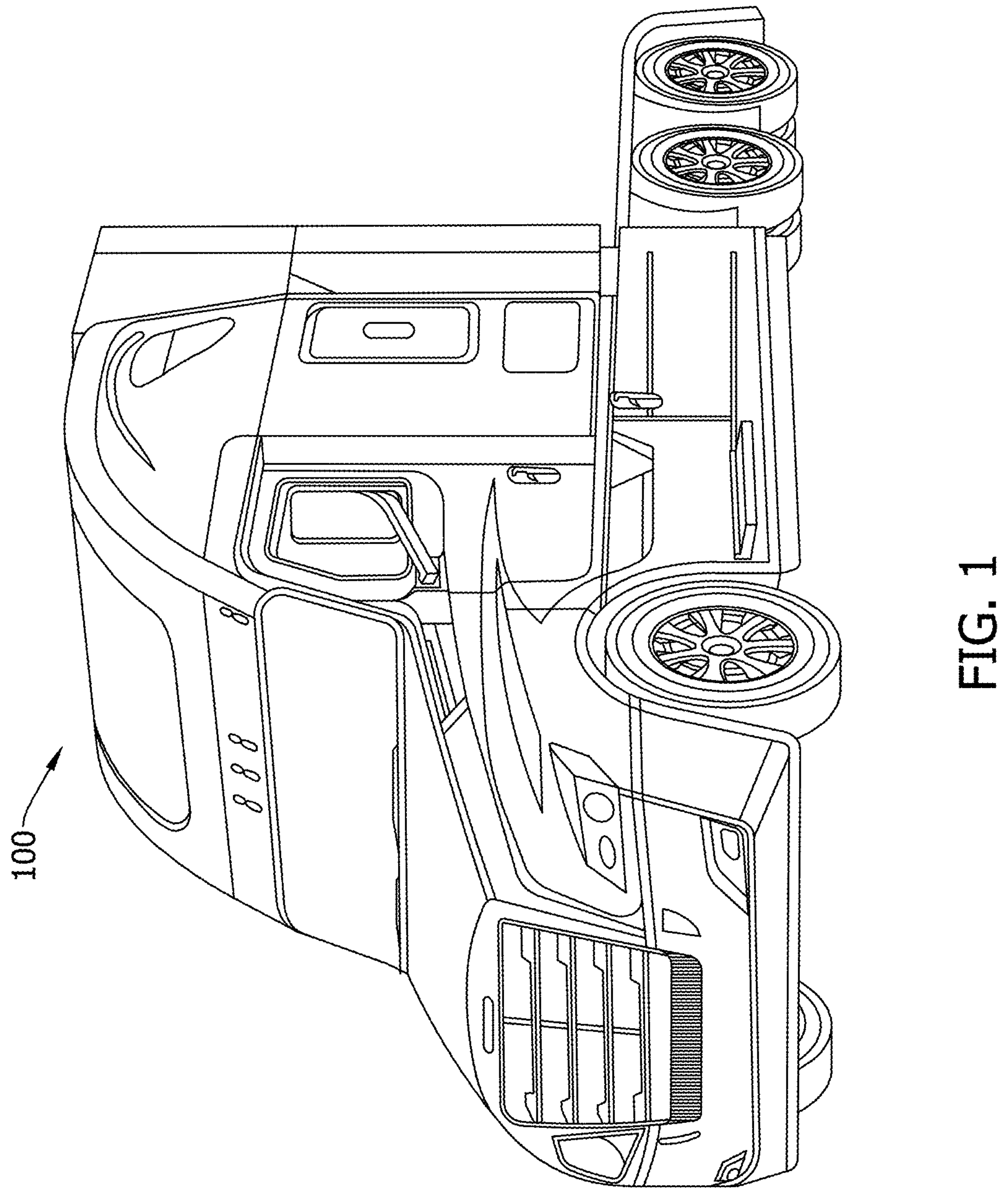
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

Systems and methods for measuring a steering angle of an autonomous vehicle is provided. It is envisioned that the systems and methods described herein may be used for any vehicle, including autonomous and non-autonomous vehicles without departing from the scope of the disclosure. The operation of an autonomous vehicle to travel on the road relies at least in part on accurate measurements of steering angle changes of the autonomous vehicle. For example, during operation of the autonomous vehicle, a processor of the vehicle calculates the steering angle of a front wheel of the autonomous vehicle. An accurate measurement of the front wheel steering angle is needed to control performance of the autonomous vehicle. Traditional steering angle measurement systems and methods are expensive and do not provide the accuracy needed for autonomous driving. The steering angle detection assembly described herein receives one or more images of a marker and determines a steering angle of the autonomous vehicle as the autonomous vehicle is moving among various other vehicles or objects on the roadway. In some embodiments, the systems and methods described herein may be packaged separately, such as a kit, from the autonomous vehicle described herein, and may be installed or retrofitted to an autonomous vehicle. Installing the steering angle measurement assembly to an autonomous vehicle does not need alteration of the autonomous vehicle. The steering angle measure assembly includes relatively few components such as a camera, one or more markers, one or more processors, and one or more memory devices. In some embodiments, the processors and memory devices may be some of the processors and the memory devices in the autonomy computing system of the autonomous vehicle. The costs of the parts are relatively inexpensive. The camera may be mounted to the autonomous vehicle, and marks may be provided on an exterior component of the autonomous vehicle. Accordingly, the steering angle measurement assembly is advantageous in providing a relatively low-cost system for measuring steering angles with increased accuracy in the measured steering angles.

Figure 2:
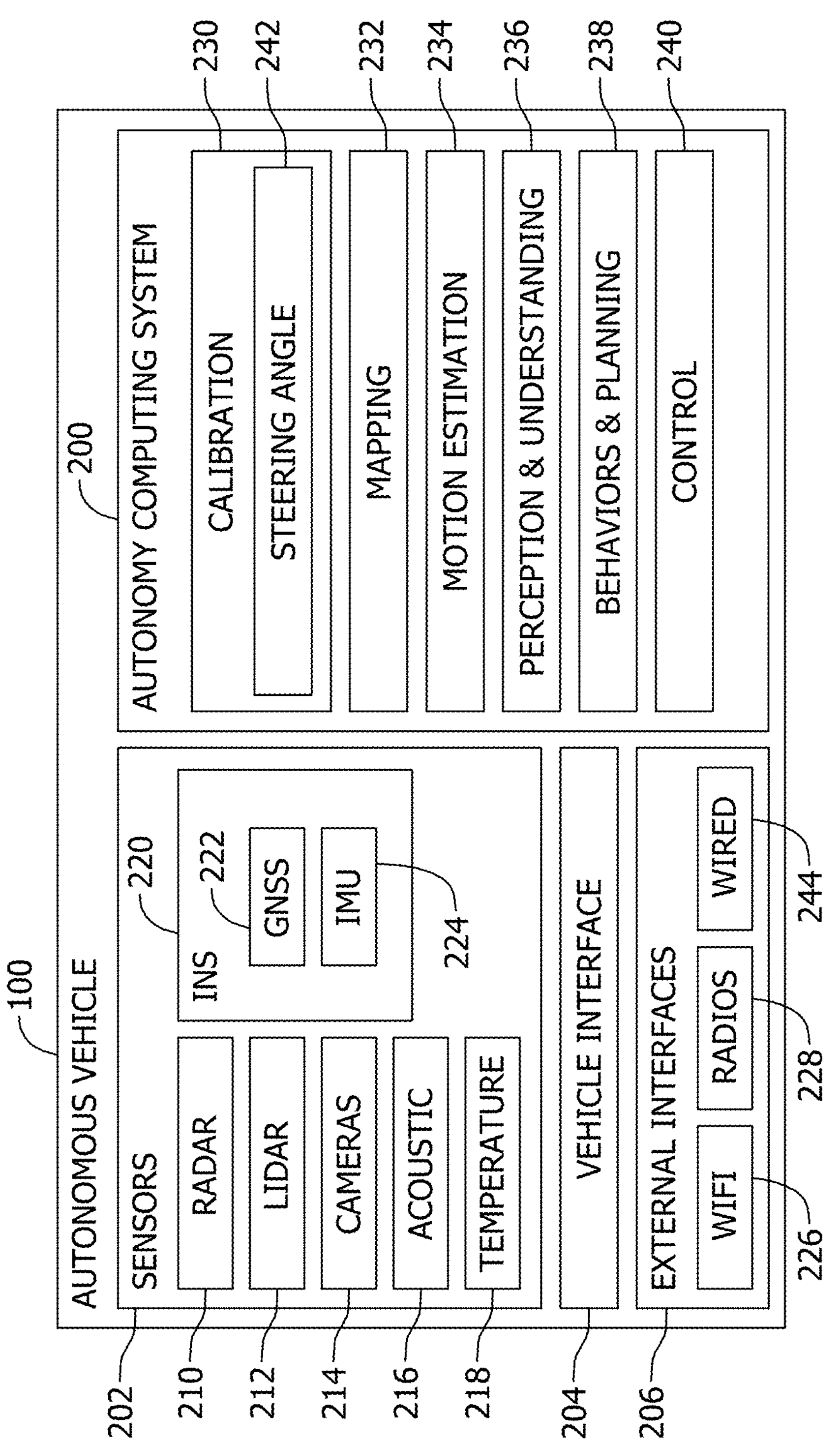
FIG. 2 is a block diagram of an autonomous vehicle.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (radar) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV can have any angle or aspect such that images of the areas in front of, to the side of, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas in front of, to the side of, behind, above, or below autonomous vehicle 100 can be captured and represented in the LiDAR point clouds. Radar sensors 210 may include short-range radar (SRR), mid-range radar (MRR), long-range radar (LRR), or ground-penetrating radar (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5*g*, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and steering angle module 242. Steering angle module 242, for example, may be embodied within another module, such as calibration module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Steering angle module 242 outputs a steering angle based at least in part on the position of a marker on an autonomous vehicle. Steering module 242 receives from a camera, for example, one or more images of an angle marker. The one or more images may include a first image and a reference image. Steering angle module 242 determines a position of the marker from the comparison of the first image and the reference marker image. Steering angle module 242 is further configured to determine a steering angle based at least in part on the position of the marker.

Autonomy computing system 200 of autonomous vehicle 100 may be completely autonomous (fully autonomous), semi-autonomous, or with any level of autonomy. In one example, autonomy computing system 200 can operate under Level 5 autonomy (e.g., full driving automation), Level 4 autonomy (e.g., high driving automation), Level 3 autonomy (e.g., conditional driving automation), Level 2 autonomy (e.g., partial driving automation), or Level 1 autonomy (e.g., driver assistance). As used herein the term "autonomous" includes fully autonomous, semi-autonomous, or having any level of autonomy.

Figure 3:
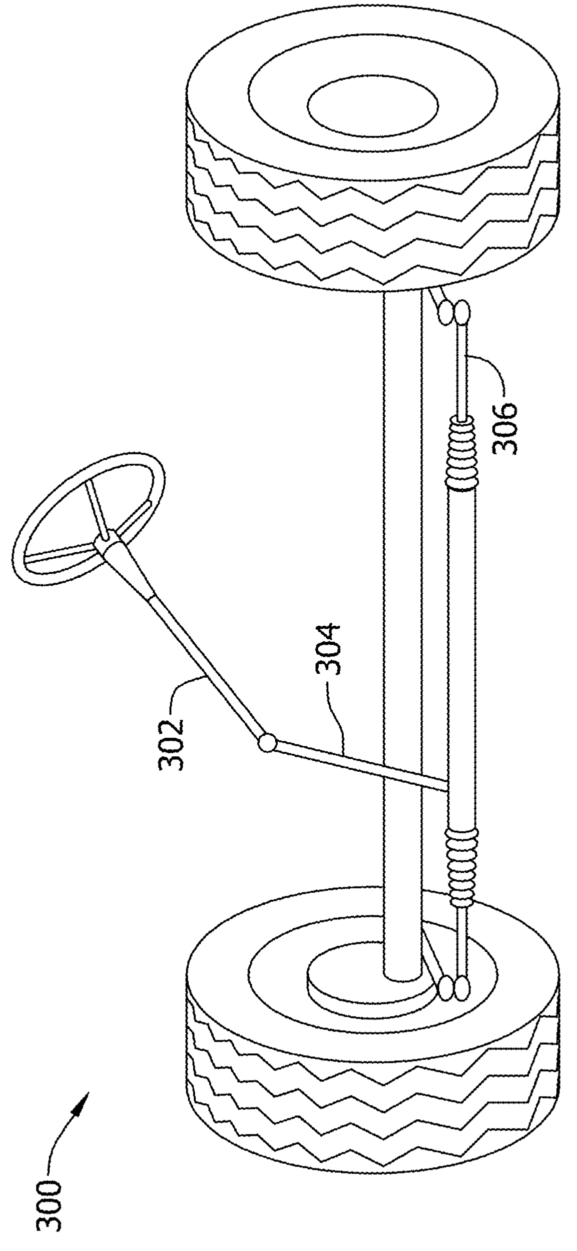
FIG. 3 shows a known steering system of a vehicle.

FIG. 3 shows a traditional steering system of a vehicle. Traditionally to measure a steering angle of a vehicle, steering angle sensors were placed on a steering column 302 or a steering shaft 304 of a vehicle. A steering angle sensor placed on the steering column 302 or the steering shaft 304 include several mechanical parts apart from a tie rod 306 which directly alters the steering angle of a wheel. This separation between the steering angle sensor and the front wheels may cause noise or error in measurement of the steering angle. For example, noise may be in the form of vibrations or movement of the mechanical parts between the front wheels and the steering angle sensor while the autonomous vehicle is in a drive mode. Unlike a traditional vehicle with a driver who can correct errors in the steering angle, an autonomous vehicle relies on the measured steering angle to control operation of the autonomous vehicle and requires increased accuracy in the measurement of steering angles. The vibrations may reduce lateral control performance and decision functions of the autonomous vehicle. In some autonomous vehicles, a steering shaft may not be activated, and the tie rod is controlled by additional actuators in the autonomous vehicle. In these embodiments, a traditional steering angle sensor cannot be used. Systems and methods described herein provide a steering angle detection assembly configured to measure a steering angle of a wheel of an autonomous vehicle with increased accuracy, thereby increasing the performance of autonomous vehicles.

Figure 4A:
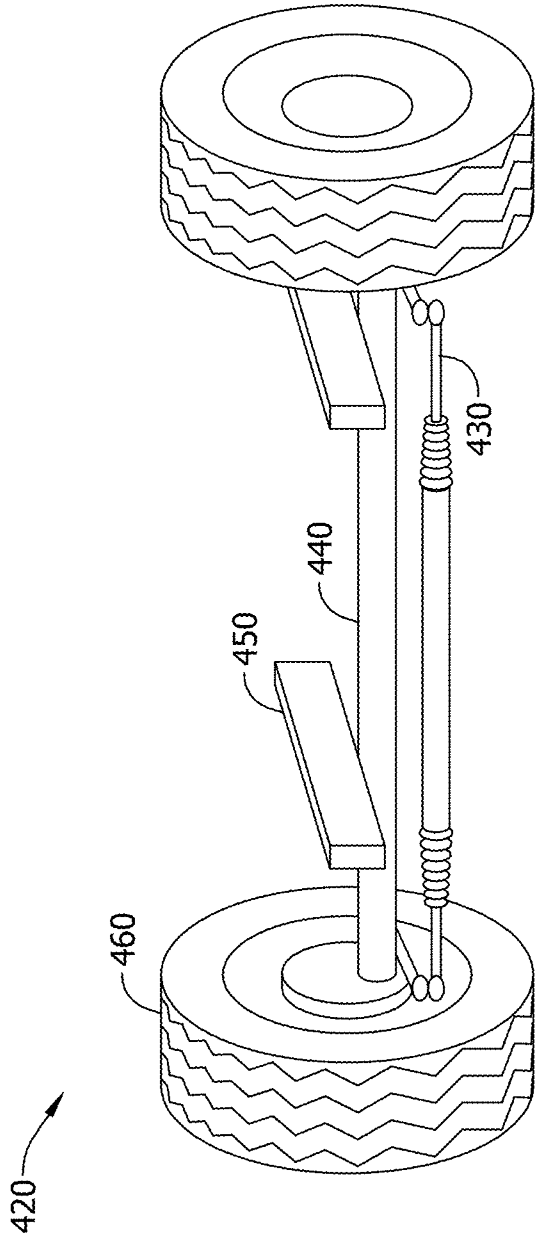
FIG. 4A is an illustrative example of an undercarriage of an autonomous vehicle.

FIG. 4A is an example of a portion of an undercarriage 420 of an autonomous vehicle 100. Undercarriage 420 includes a tie rod 430, an axle 440, and a tire 460. In the example embodiments herein, a steering angle detection assembly 400 (see FIG. 4B described later) may be mounted to autonomous vehicle 100. For example, steering angle detection assembly 400 is mounted on tie rod 430 and axle 440. In some embodiments, steering angle detection assembly 400 is mounted on tie rod 430 and a part of autonomous vehicle 100 that is at a location stationary relative to axle 440. As can be appreciated, when steering angle detection assembly is placed on tie rod 430 and axle 440 or on a part at a location stationary relative to axle 440, the steering angle may be determined directly, with reduced or no part separation, thereby having a higher accuracy than a traditional steering angle sensor.

Figure 4B:
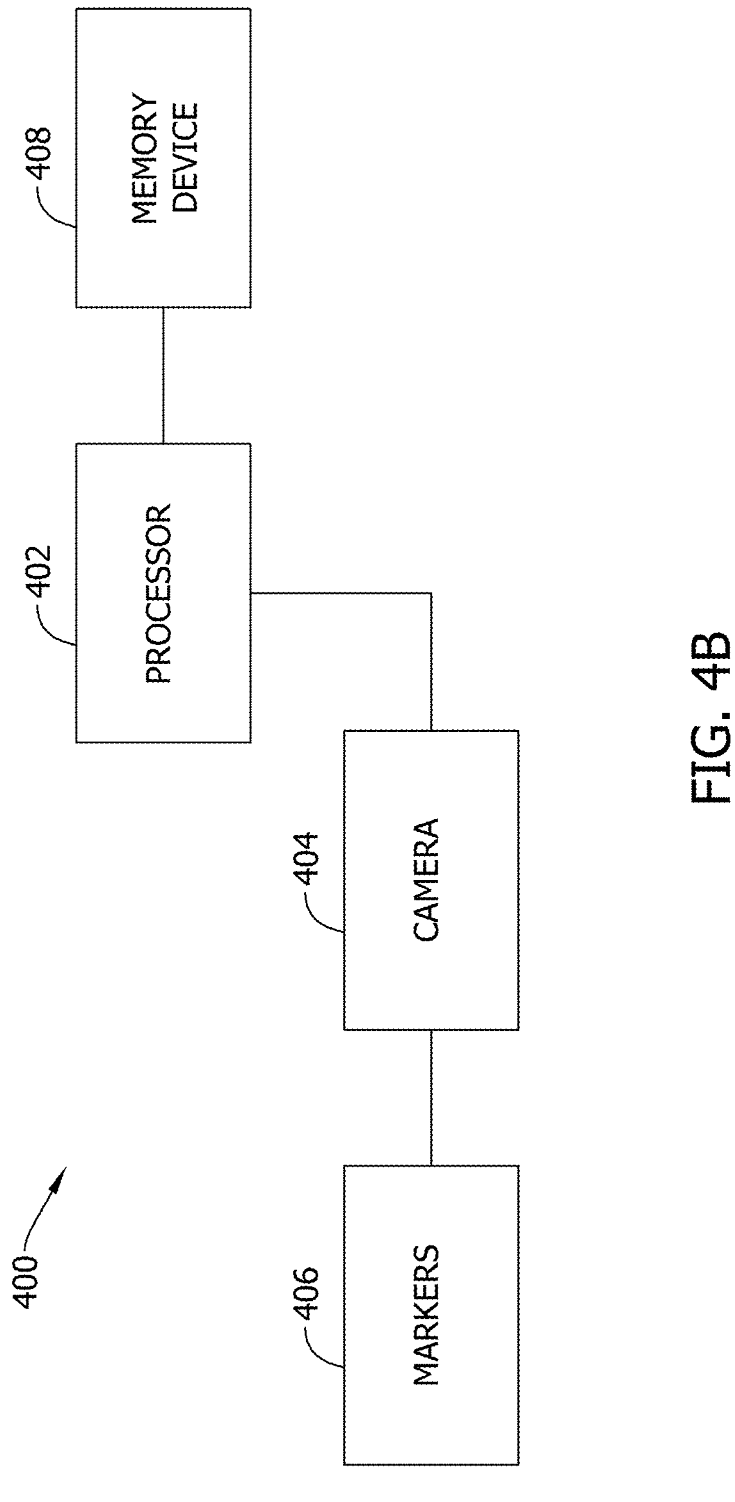
FIG. 4B is a block diagram of a steering angle detection assembly.

FIG. 4B is a block diagram of the steering angle detection assembly 400. In the example embodiments, steering angle detection assembly 400 includes a memory device 408, a processor 402, a camera 404, and one or more angle markers 406. Processor 402 and/or memory device 408 may be part of or separate from autonomy computing system 200. In some embodiments, processor 402 and/or memory device 408 are included in one or more microcontrollers.

In the example embodiment, camera 404 is operable to capture one or more images of angle markers 406 in an undercarriage environment of the vehicle 100. For example, while vehicle 100 is in a drive mode, camera 404 is operable to capture one or more images of angle markers 406. Camera 404 may be mounted to any portion of vehicle 100 that is stationary relative to axle 440 of vehicle 100 while in a drive mode. For example, camera 404 is mounted to an axle of autonomous vehicle 100 which is stationary as compared to other portions of vehicle 100 while in a drive mode. In other examples, camera 404 may be mounted to any suitable location, such as any part of the chassis of vehicle 100. In some embodiments camera 404 may be similar to cameras 214 described previously. In other embodiments, camera 404 may be any camera operable to capture images of angle markers 406 in a low-light environment such as the undercarriage of vehicle 100.

In the example embodiments, angle markers 406 may be any visually identifiable marker detectable by camera 404. Camera 404 is positioned at a location such that angle marker 406 is in the field of view (FOV) of camera 404. Angle markers 406 may include unique visual features, such as geometric shapes, colors, contrasts, and/or patterns, that are easily distinguishable from the surrounding undercarriage environment of vehicle 100. For example, angle markers 406 may be a rectangular sticker of a black cross on a white background. When images of angle markers 406 are captured by camera 404, image processing software may easily identify position of angle markers 406. In the example embodiment, one or more angle markers 406 are placed on a tie rod of vehicle 100.

In the example embodiment, the steering angle detection assembly 400 employs the processor 402 to send commands to camera 404 to take one or more images or video frames of angle markers 406 and reference markers 640 when vehicle 100 is in a drive mode. While in a drive mode, steering will cause angle markers 406 placed on a tie rod to change position. This position of the tie rod corresponds to a steering angle which can be determined through image processing by processor 402. For example, processor 402 may use edge detection to compare a position of angle marker 406 in the one or more images with a position of angle marker 406 in the reference image and calculate a steering angle based at least in part on the position of the angle markers 406.

In the example embodiment, the steering angle detection assembly 400 further employs the processor 402 to use edge detection to compare a change in position of angle markers 406 over time and calculate a change in steering angle over time based, at least in part, on the change in position of the angle markers 406.

In the example embodiment, the reference image may be an image selected from the one or more images taken by camera 404. Alternatively or additionally, the reference image may be any image pre-stored within a memory device of the steering angle detection assembly. When processor 402 compares a position or a change in position of angle markers 406, processor 402 may use the reference image as an initial position of angle markers 406. For example, the reference image may be a pre-stored image of the angle markers 406 when autonomous vehicle 100 is parked and the front wheels are pointed forwards.

In the example embodiment, autonomous vehicle 100 may further include one or more reference markers 640 (see FIGS. 6 and 7 described later). Reference markers 640 may be similar to angle markers 406 or include different colors or shapes to be more easily distinguished by imaging processing software. For example, angle markers 406 may be a white cross on a black background and reference markers 640 may be a red cross on a yellow background. In the example embodiment, reference markers 640 may be placed at a location that is stationary relative to camera 404, while additionally on a location in the field of view (FOV) of camera 404. For example, reference markers 640 may be placed on the same axle as camera 404. In other examples, reference markers 640 may be placed on a different portion of the undercarriage of vehicle 100 that is stationary relative to camera 404.

In some embodiments, processor 402 may additionally use reference markers 640 to reduce vibration of camera 404 and increase accuracy of the calculation of a steering angle. When steering angle detection assembly 400 employs processor 402 to send commands to camera 404 to take a plurality of images of angle markers 406 and reference markers 640, reference markers 640 may be used as a stationary point of reference for the imaging processing done by processor 402. Since camera 404 and reference marker 640 are in a stationary position relative to one another as compared to angle markers 406, processor 402 may be employed to determine vibration of camera 404 based on the positions of reference marker 640 and reduce vibration by filtering signals of a steering angle.

In other embodiments, vibration in camera 404 may be removed by directly filtering the signals of the steering angle. For example, a time series of measurements of the steering angle is provided. The time series may be applied with a filter to remove the signals from vibration in the time series. Signals from vibration may have unique patterns, such as noise or a periodical time series. The signals having such unique patterns are filtered to remove vibration in the measure steering angles.

Figure 5B:
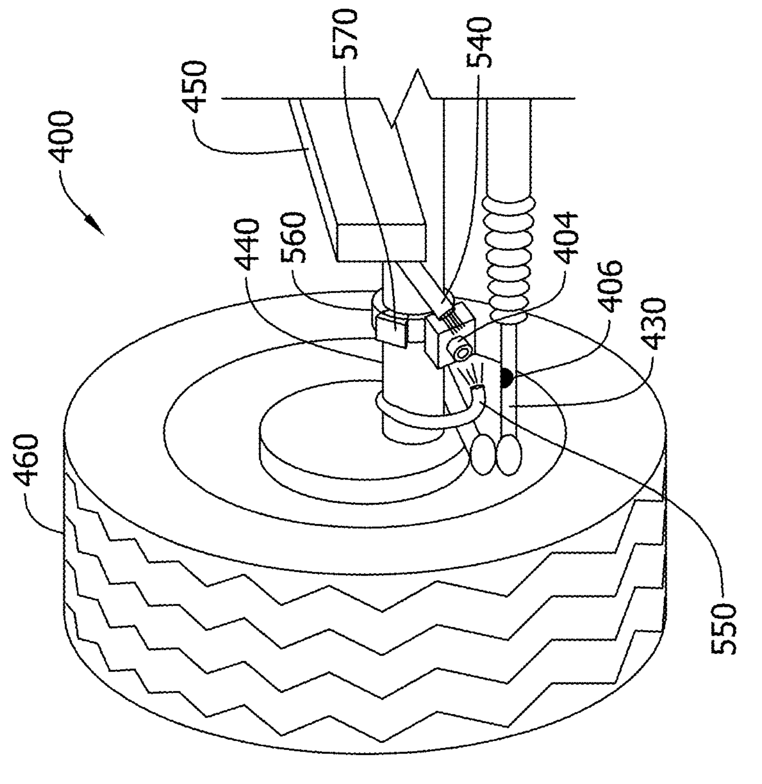
FIG. 5B is a side view of the undercarriage of an autonomous vehicle, illustrating the first embodiment of a steering angle detection assembly.
Figure 5A:
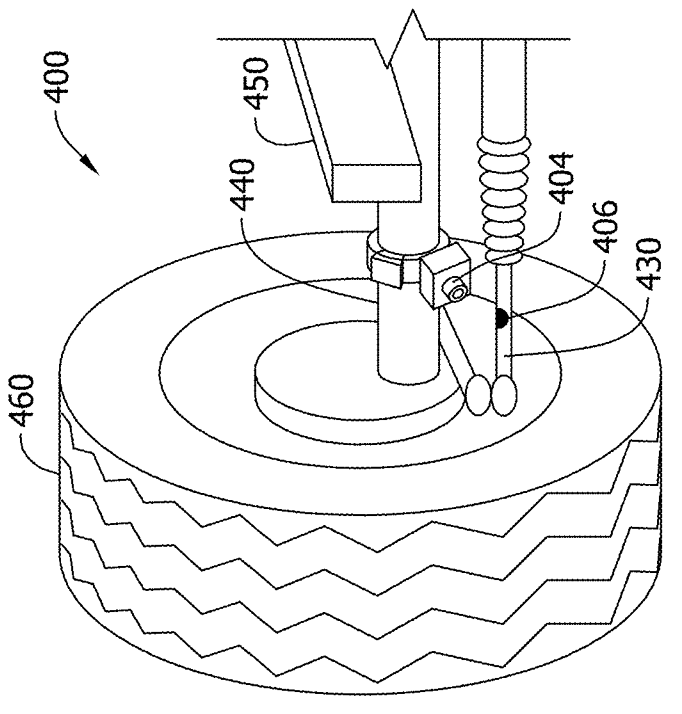
FIG. 5A is an elevation view of the undercarriage of an autonomous vehicle, illustrating a first embodiment of a steering angle detection assembly.

Turning to FIG. 5A, an example embodiment of a steering angle detection assembly 400 mounted to vehicle 100 operable to measure a steering angle is illustrated. For ease of reference, like reference numbers are used for similar components as those set forth above. Steering angle detection assembly 400 includes a camera 404 and one or more angle markers 406. Camera 404 may be mounted to any portion of vehicle 100 that is stationary relative to the structure of vehicle 100 while in a drive mode, such as axle 440. As can be appreciated, the position of camera 404 may be changed as the size and geometry of the available room in the undercarriage of the vehicle 100 changes with different iterations or modification of vehicle 100, such as the frame 450. In the example embodiments, camera 404 is operable to capture images of angle markers 406. In the example embodiments angle markers 406 may include unique visual features, such as geometric shapes, colors, contrasts, and/or patterns, that are easily distinguishable from the surrounding undercarriage environment of vehicle 100. For example, angle markers 406 may be a rectangular sticker of a black cross on a white background.

In a first example embodiment shown in FIG. 5A, angle marker 406 is placed on tie rod 430. As vehicle 100 is steered and angle marker 406 moves, camera 404 will take one or more images of the position and change in position of angle marker 406. During a drive mode of vehicle 100, tie rod 430 operates to change the steering angle of front wheel 460. When vehicle 100 is in a drive mode, steering will cause angle marker 406 placed on tie rod 430 to move either forwards or backwards. The position of tie rod 430 corresponds to a steering angle that can be determined as described previously herein.

FIG. 5B is a side view of an example embodiment of steering angle detection assembly 400. In the depicted embodiment, steering angle detection assembly 400 may include a light source 540. Steering angle detection assembly 400 further includes a cleaning device 550. In order to ensure clarity of the one or more marker images and improve performance, steering angle detection assembly 400 may include light source 540 and/or cleaning device 550 to improve image quality. In non-limiting embodiments cleaning device 550 may include wipers to clean a lens of camera 404, and/or fluid lines capable of removing obstructions in the FOV of camera 404.

In the example embodiment, steering angle detection assembly 400 may include a fixed portion 560 and a removable portion 570. Fixed portion 560 may be any mount operable to be coupled with autonomous vehicle 100. For example, fixed portion 560 may be a steel mount operable to be adhered to axle 440. Removable portion 570 is operable to be removably coupled with fixed portion 560 and camera 404. For example, removable portion 570 may include one or more clip mounts operable with fixed portion 560 and camera 404.

Figure 6:
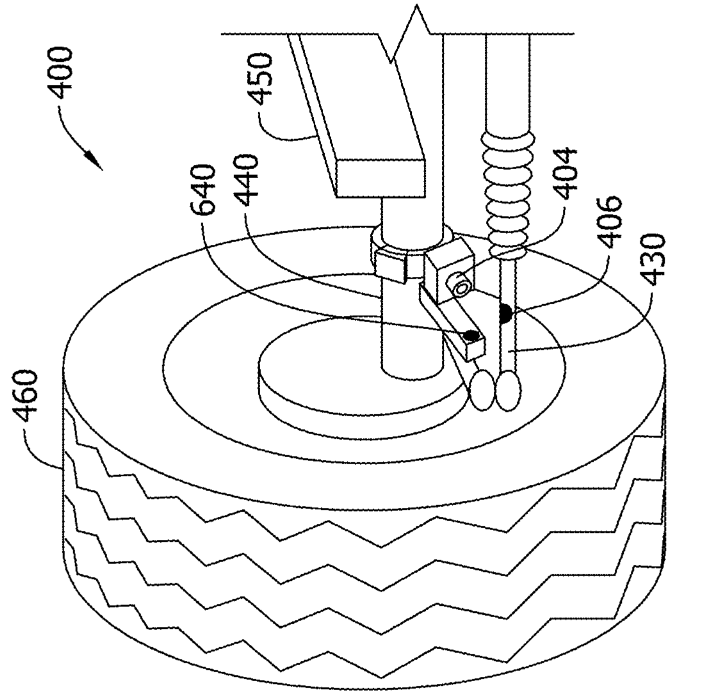
FIG. 6 is an elevation view of the undercarriage of an autonomous vehicle, illustrating a second embodiment of a steering angle detection assembly.

FIG. 6 is a second example embodiment of a steering angle detection assembly 400. For ease of reference, like reference numbers are used for similar components as those set forth above. In the example embodiment, steering angle detection assembly 400 further includes one or more reference markers 640. Reference marker 640 is placed in the FOV of camera 404. When vehicle 100 is in a drive mode, steering will cause angle marker 406 placed on tie rod 430 to move either forwards or backwards. As vehicle 100 is steered and angle marker 406 moves, camera 404 will take a plurality of images of the change in position of angle marker 406 and which will further include reference marker 640 placed on axle 440 in the plurality of images.

Figure 7:
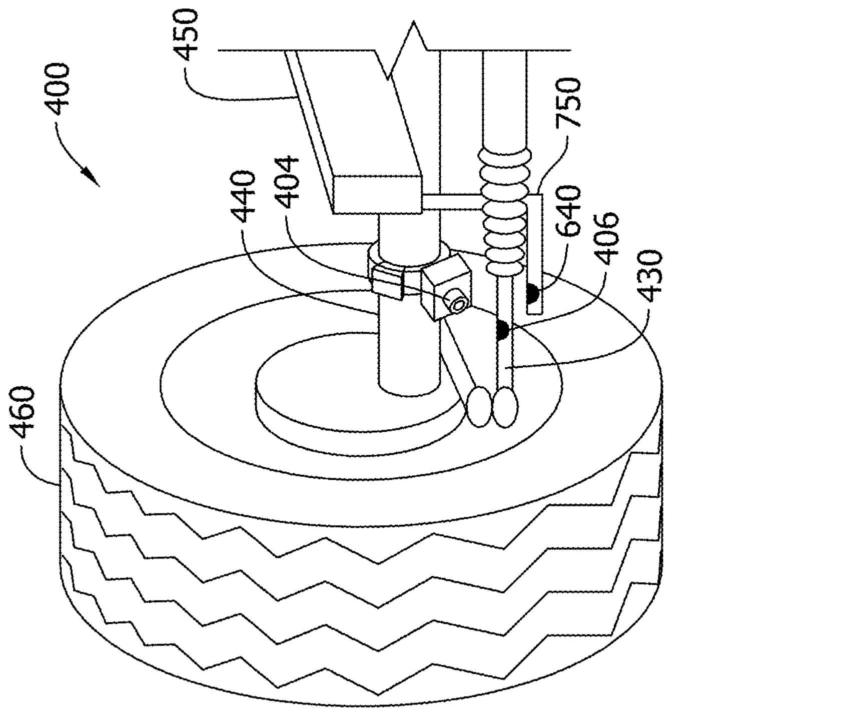
FIG. 7 is an elevation view of the undercarriage of an autonomous vehicle, illustrating a third embodiment of a steering angle detection assembly.

FIG. 7 is a third example embodiment of a steering angle detection assembly 400 including one or more reference markers 640 placed on an extension 750 mounted on frame 450 and in the FOV of camera 404. For ease of reference, like reference numbers are used for similar components as those set forth above. When vehicle 100 is in a drive mode, steering will cause angle marker 406 placed on tie rod 430 to move either forwards or backwards. As vehicle 100 is steered and angle marker 406 moves, camera 404 will take one or more images of the position and change in position of angle marker 406 and which will further include reference marker 640 placed on extension 750 in the one or more images.

After one or more images are captured by camera 404 in steering angle detection assemblies 400, the one or more images is received by steering angle module 242. Steering angle module 242 is operable to perform image processing and steering angle determination on the one or more images to determine a steering angle. Steering angle module 242 is further operable to calculate a steering angle or a change in a steering angle with further use of reference markers 640. When reference markers 640 are placed on a position stationary relative to camera 404, reference markers 640 may be used to remove any vibrations experienced by camera 404 relative to the mounted location of camera 404 and improve the steering angle determination.

Although a steering angle detection assembly has been described herein as being featured in an autonomous vehicle 100, it should be appreciated that the steering angle detection assembly may be featured or adapted for use in non-autonomous vehicle. For example, the steering angle detection assembly will enable a driver of a non-autonomous vehicle to receive steering angle data while in a drive mode of the non-autonomous vehicle. This may prove useful in certain embodiments where a steering angle detection assembly is placed near a front wheel of a non-autonomous vehicle. In this example, in a drive mode of the non-autonomous vehicle, the driver will receive steering angle measurements of the front wheel from the steering angle detection assembly.

Figure 8:
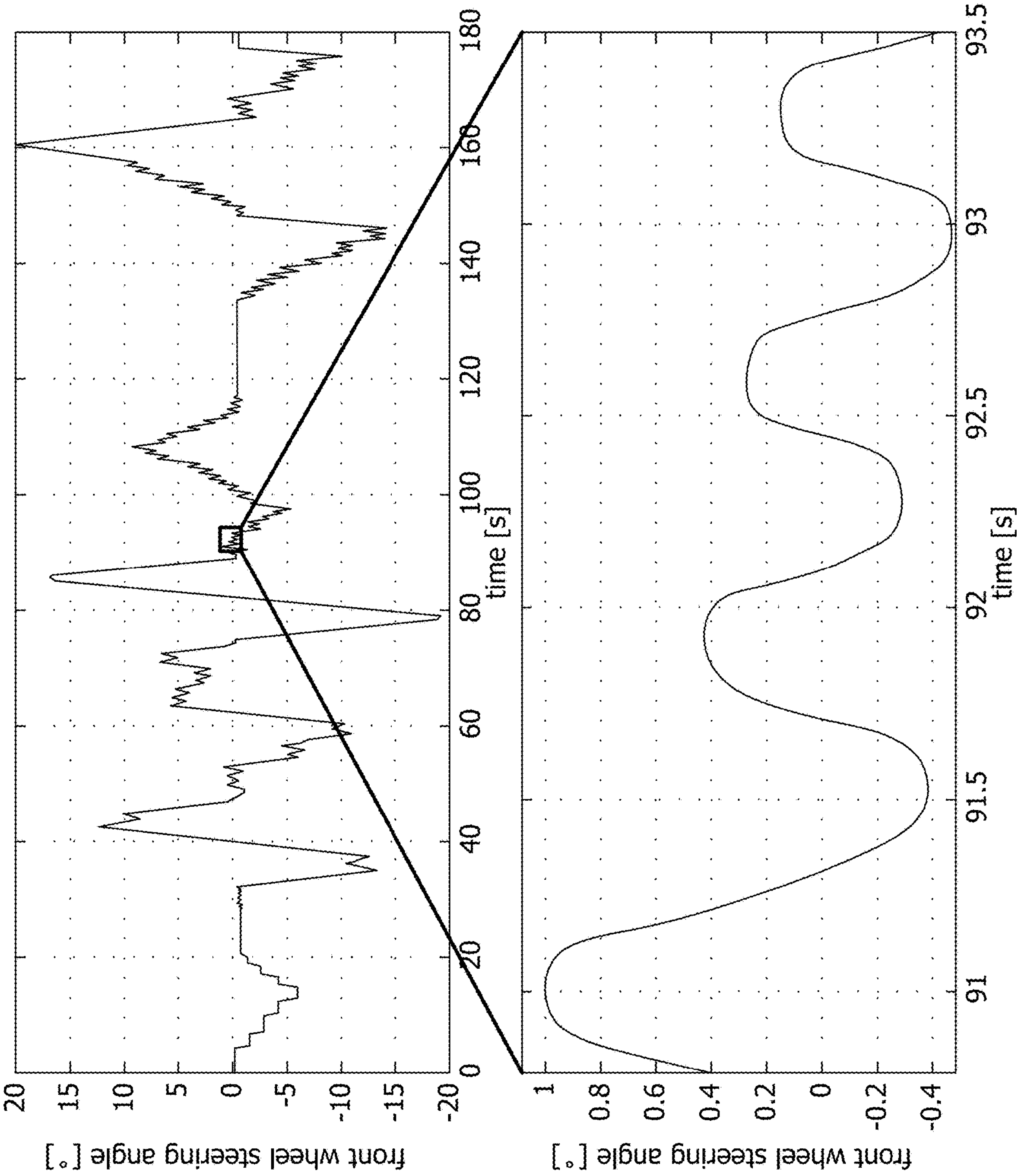
FIG. 8 is a graph illustrating an example measurement of a steering angle of an autonomous vehicle.

In order to illustrate the results, an example usage of a steering angle assembly described herein and results acquired is illustrated in FIG. 8. As shown in these graphs, a steering angle of a vehicle can be measured to a resolution of 0.1 degrees.

Figure 9:
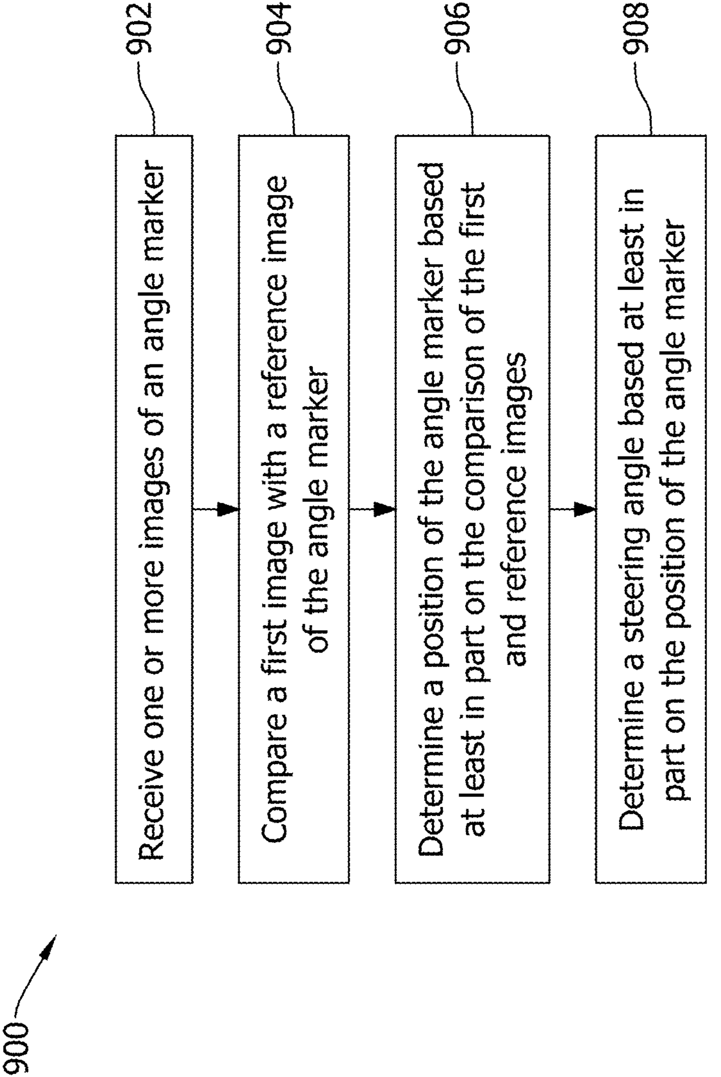
FIG. 9 is a flow chart of an example method of measuring a steering angle of an autonomous vehicle.

FIG. 9 is a flow chart of the example method 900 for measuring a steering angle of an autonomous vehicle. Method 900 may be implemented by processors of autonomy computing system 200 of autonomous vehicle 100. In other embodiments, method 900 may be implemented by processors in steering angle detection assembly 400. In the example embodiment, method 900 includes receiving 902 a first image of an angle marker. Method 900 also includes comparing 904 the first image of the angle marker with a reference image of the angle marker. Method 900 also includes determining 906 a position of the angle marker based, at least in part, on the comparison of the first marker image and reference image. Method 900 further includes determining 908 a steering angle based at least in part on the position of the angle marker.

Figure 10:
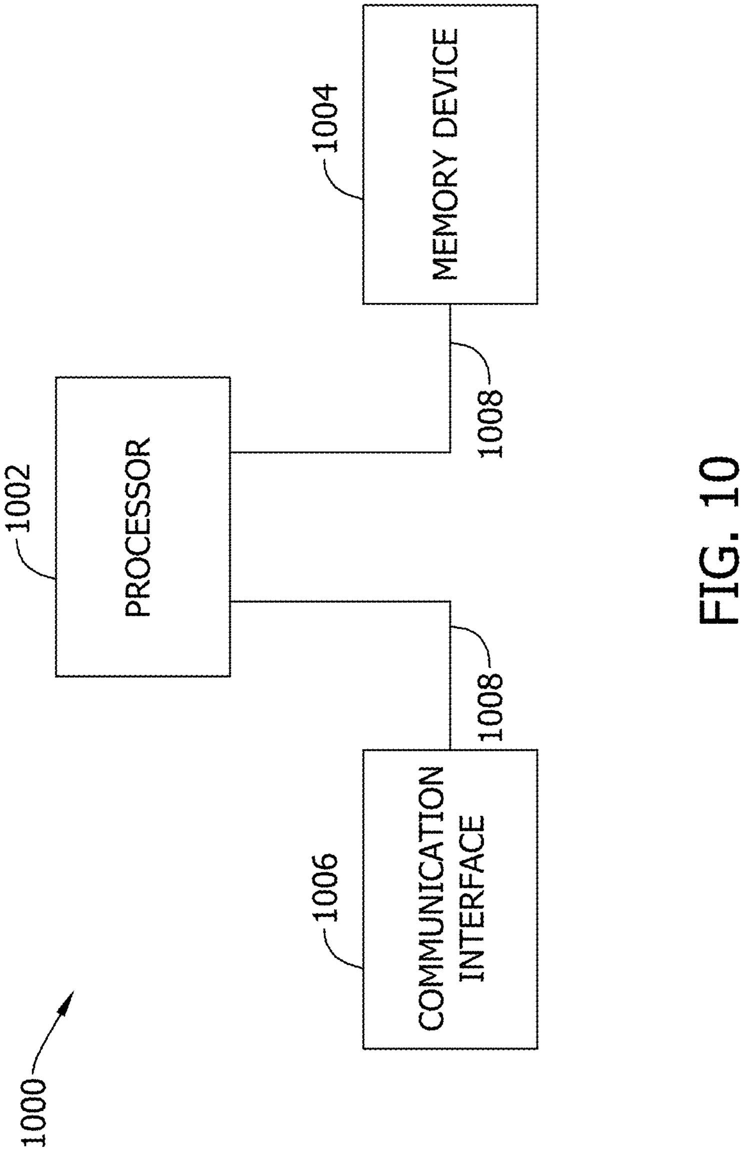
FIG. 10 is a block diagram of an example computing device.

FIG. 10 is a block diagram of an example computing device 1000. Computing device 1000 includes a processor 1002 and a memory device 1004. Processor 1002 is coupled to memory device 1004 via a system bus 1008. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, memory device 1004 includes one or more devices that enable information, such as executable instructions or other data (e.g., sensor data), to be stored and retrieved. Moreover, memory device 1004 includes one or more computer readable media, such as, without limitation, dynamic random access memory (DRAM), static random access memory (SRAM), a solid state disk, or a hard disk. In the example embodiment, memory device 1004 stores, without limitation, application source code, application object code, configuration data, additional input events, application states, assertion statements, validation results, or any other type of data. The computing device 1000, in the example embodiment, may also include a communication interface 1006 that is coupled to processor 1002 via system bus 1008. Moreover, communication interface 1006 is communicatively coupled to data acquisition devices.

In the example embodiment, processor 1002 may be programmed by encoding an operation using one or more executable instructions and providing the executable instructions in memory device 1004. In the example embodiment, processor 1002 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) a steering angle detection assembly that determines a steering angle more accurately than traditional angle sensors, or (b) a steering angle detection assembly that does not permanently alter the vehicle.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A steering angle detection assembly for measuring a steering angle of a vehicle, the steering angle detection assembly comprising:

- a camera configured to capture one or more images of an angle marker positioned on a tie rod of a vehicle, the camera configured to be mounted on the vehicle at a location stationary relative to an axel of the vehicle;
- at least one memory device; and
- at least one processor in communication with the at least one memory device, the at least one processor programmed to:
  - receive a first image of the angle marker;
  - compare the first image with a reference image of the angle marker;
  - determine a position of the angle marker based on comparison of the first image with the reference image;
  - determine a steering angle based at least in part on the position of the angle marker; and
  - output the steering angle.

2. The steering angle detection assembly of claim 1, further comprising a reference marker positioned at a location of the vehicle stationary relative to the camera and in a field of view of the camera.

3. The steering angle detection assembly of claim 2, wherein:

- the one or more images further include the reference marker in at least one image of the one or more images; and
- the at least one processor is further programmed to:
  - determine positions of the reference marker in the one or more images;
  - determine vibration of the camera based on the positions of the reference marker; and
  - determine the steering angle by removing the vibration from the steering angle.

4. The steering angle detection assembly of claim 1, wherein the at least one processor is further programmed to:

- reduce vibration in positions of the angle marker by filtering signals of the steering angle.

5. The steering angle detection assembly of claim 1, wherein:

- the camera is removably attached at a mounting location on the vehicle.

6. The steering angle detection assembly of claim 5, further comprising a mounting assembly, wherein the mounting assembly comprises:

- a fixed portion fixedly coupled with the vehicle; and
- a removable portion removably coupled with the fixed portion and configured to be coupled with the camera.

7. The steering angle detection assembly of claim 1, further comprising a cleaning system configured to remove obstructions from a field of view of the camera.

8. The steering angle detection assembly of claim 1, wherein the at least one processor is further programmed to:

- determine a change in position of the angle marker based on comparison of the one or more images with the reference image;
- determine a change in steering angle based at least in part on the change in position of the angle marker; and
- output the change in steering angle.

9. The steering angle detection assembly of claim 1, further comprising a light source configured to illuminate a field of view of the camera.

10. A method of measuring a steering angle of a vehicle, the method comprising:

- receiving one or more images of an angle marker positioned on a tie rod of a vehicle, the one or more images captured by a camera, the camera configured to be mounted on a vehicle at a location stationary relative to an axle of the vehicle;
- comparing a first image of the one or more images with a reference image of the angle marker;
- determining a position of the angle marker based on the comparison of the first image with the reference image; and
- determining a steering angle based at least in part on the change in position of the angle marker.

11. The method of claim 10,

- wherein the one or more images further include a reference marker, the method further comprising:
- determining a position of the reference marker;
- determining vibration of the camera based on the position of the reference marker; and
- determining the steering angle by removing the vibration from the steering angle.

12. The method of claim 10, wherein the method further comprises:

- determining a change in position of the angle marker based on comparison of the one or more images with the reference image; and
- determining a change in steering angle based at least in part on the change in position of the angle marker.

13. The method of claim 10, wherein the method further comprises

- reducing vibration in positions of the angle marker by filtering signals of the steering angle.

14. The method of claim 10, further comprising:

- removing, via a cleaning system, obstructions from a field of view of the camera.

15. The method of claim 10, further comprising:

- illuminating, via a light source, a field of view of the camera.

16. One or more non-transitory machine-readable storage media for measuring a steering angle of a vehicle, the one or more non-transitory machine-readable storage media comprising a plurality of instructions stored thereon that, in response to being executed, cause a system to:

- receive one or more images of an angle marker;
- compare a first image of the one or more images with a reference image of the angle marker;
- determine a position of the angle marker based on the comparison of the first image with the reference image; and determine a steering angle based at least in part on the position of the angle marker.

17. The one or more non-transitory machine-readable storage media of claim 16, wherein the one or more images further comprises a reference marker, the plurality of instructions further causing the system to:

determine a position of the reference marker;

determine vibration of a camera based on the positions of the reference marker; and determine the steering angle by removing the vibration from the steering angle.

18. The one or more non-transitory machine-readable storage media of claim 16, wherein the plurality of instructions further cause the system to:

determine a change in position of the angle marker based on comparison of the one or more images; and determine a change in steering angle based at least in part on the change in position of the angle marker.

19. The one or more non-transitory machine-readable storage media of claim 16, wherein the plurality of instructions further cause the system to:

cause a cleaning system to remove obstructions from a field of view of the camera.

20. The one or more non-transitory machine-readable storage media of claim 16, wherein the plurality of instructions further cause the system to:

cause a light source to illuminate a field of view of the camera.

* * * * *